(No Model.)
H. HEY.
VERMIN TRAP.
No. 246,771. Patented Sept. 6, 1881.
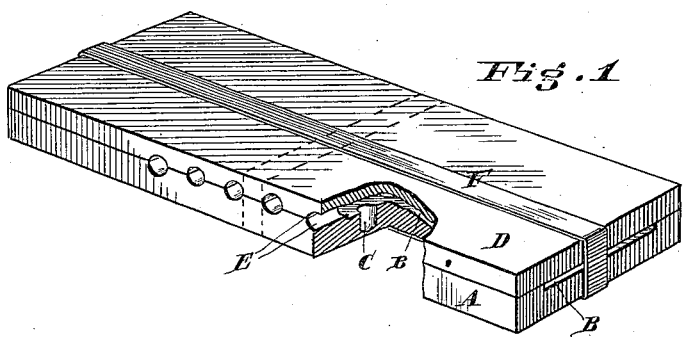
Fig. 1
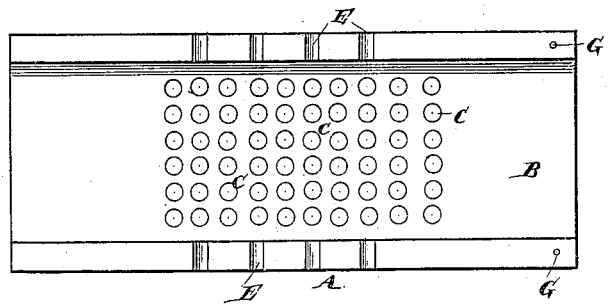
Fig. 2
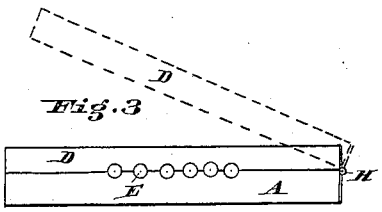
Fig. 3
Attests
Inventor
Hannah Hey
By her atty.

UNITED STATES PATENT OFFICE.

HANNAH HEY, OF PHILADELPHIA, PENNSYLVANIA.

VERMIN-TRAP.

SPECIFICATION forming part of Letters Patent No. 246,771, dated September 6, 1881.

Application filed March 25, 1881. (No model.)

*To all whom it may concern:*

Be it known that I, HANNAH HEY, of the city and county of Philadelphia, in the State of Pennsylvania, have invented an Improvement in Traps for Catching Vermin, of which the following is a specification.

My invention has reference to traps for the removal of vermin from beds, closets, &c.; and it consists, essentially, of a block or piece of wood provided with a series of small holes or perforations, as is more fully set forth in the following specification and shown in the accompanying drawings, which form part thereof.

The object of my invention is to provide a receptacle adapted to induce vermin, such as bed-bugs, to inhabit the same, when upon removing said receptacle the vermin can be caught and killed.

In the drawings, Figure 1 is a perspective of one form of a receptacle embodying in it my invention. Fig. 2 is a plan of the lower part or body of same. Fig. 3 is a side elevation, showing the body and lid hinged together.

A is the body, and is preferably grooved at B, and the surface of said groove is perforated, as at C. A smooth or other conveniently-shaped lid, D, fits upon the body A, and the flanges on either side of the groove B may be perforated, or the perforations may be at the juncture of the lid and body, as at E. This gives access to the perforations or holes C in the body A of the receptacle. If desired, the lid also may be perforated.

The lid D when used may be secured to the body by a rubber band, F, or other equivalent device, as by pins G, or hinged at H, or may be loose upon it.

The receptacle is placed in the bed under the mattress and close to the joints. The receptacle, being preferably of unpainted pine wood, is a more acceptable habitation than the bed, and the bugs enter the holes and perforations, and in the morning can be easily removed by knocking the same over a slop-pail, when they fall out. After once being occupied the attraction is far greater.

If desired, several of these receptacles may be placed in one bed, and the killing of a bug in a new receptacle will increase its attraction.

Having now described my invention, what I claim as new, and desire to secure by Letters Patent, is—

1. A trap for catching vermin, consisting of a block of wood provided with a number of small perforations or holes, substantially as shown and described.

2. A trap for catching vermin, consisting of the block of wood A, provided with holes C and flat groove B, as shown and described.

3. A trap for catching vermin, consisting of the block A, provided with small holes C and flat groove B, in combination with a cover, D, and elastic band F, substantially as and for the purpose specified.

In testimony of which invention I hereunto set my hand.

HANNAH HEY.

Witnesses:
 R. M. HUNTER,
 LISLE STOKES.